Figure 1:
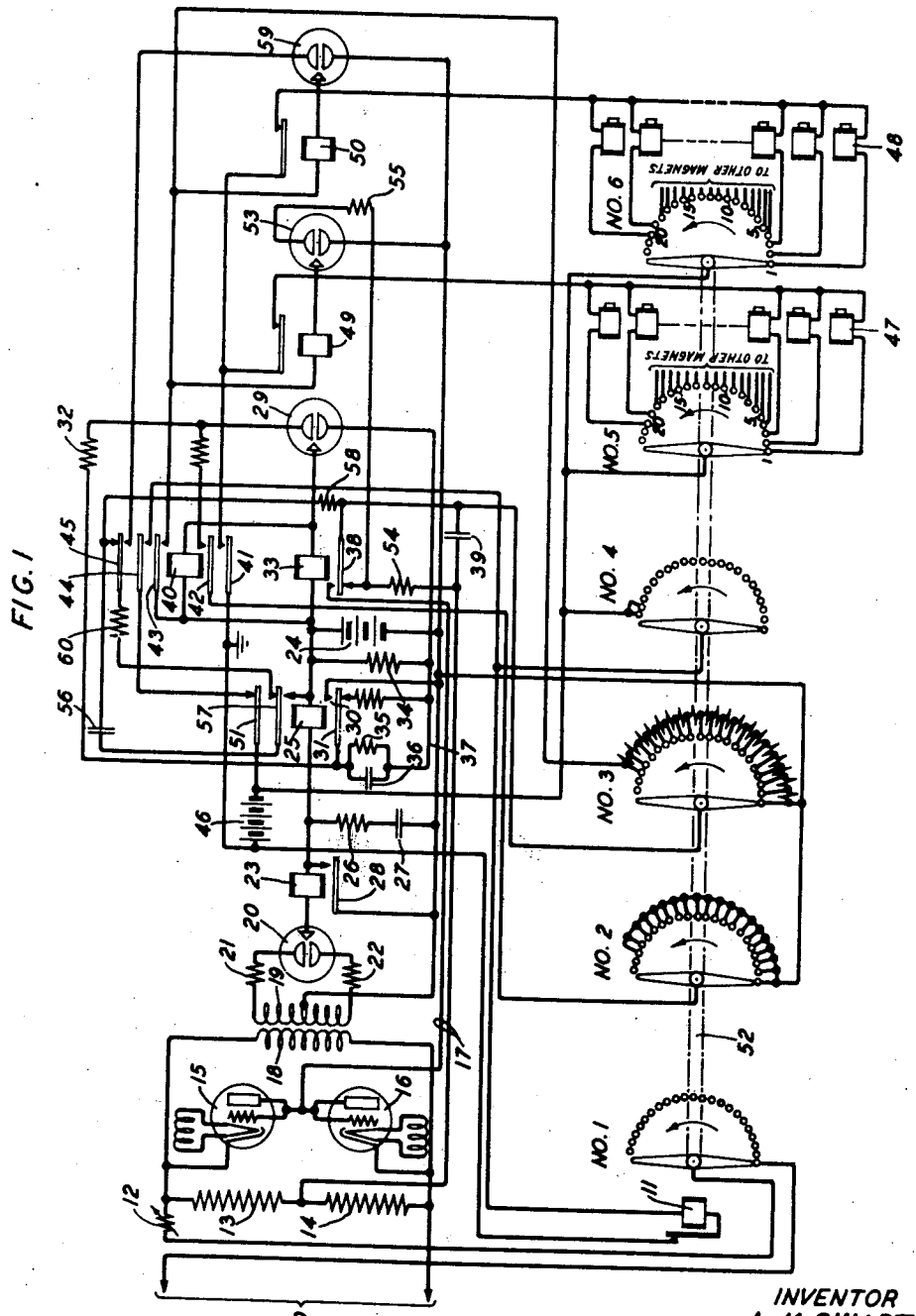

Aug. 31, 1937.  L. K. SWART  2,091,533
AUTOMATIC MEASURING DEVICE
Filed Nov. 7, 1936  2 Sheets-Sheet 1

INVENTOR
L. K. SWART
BY
[signature]
ATTORNEY

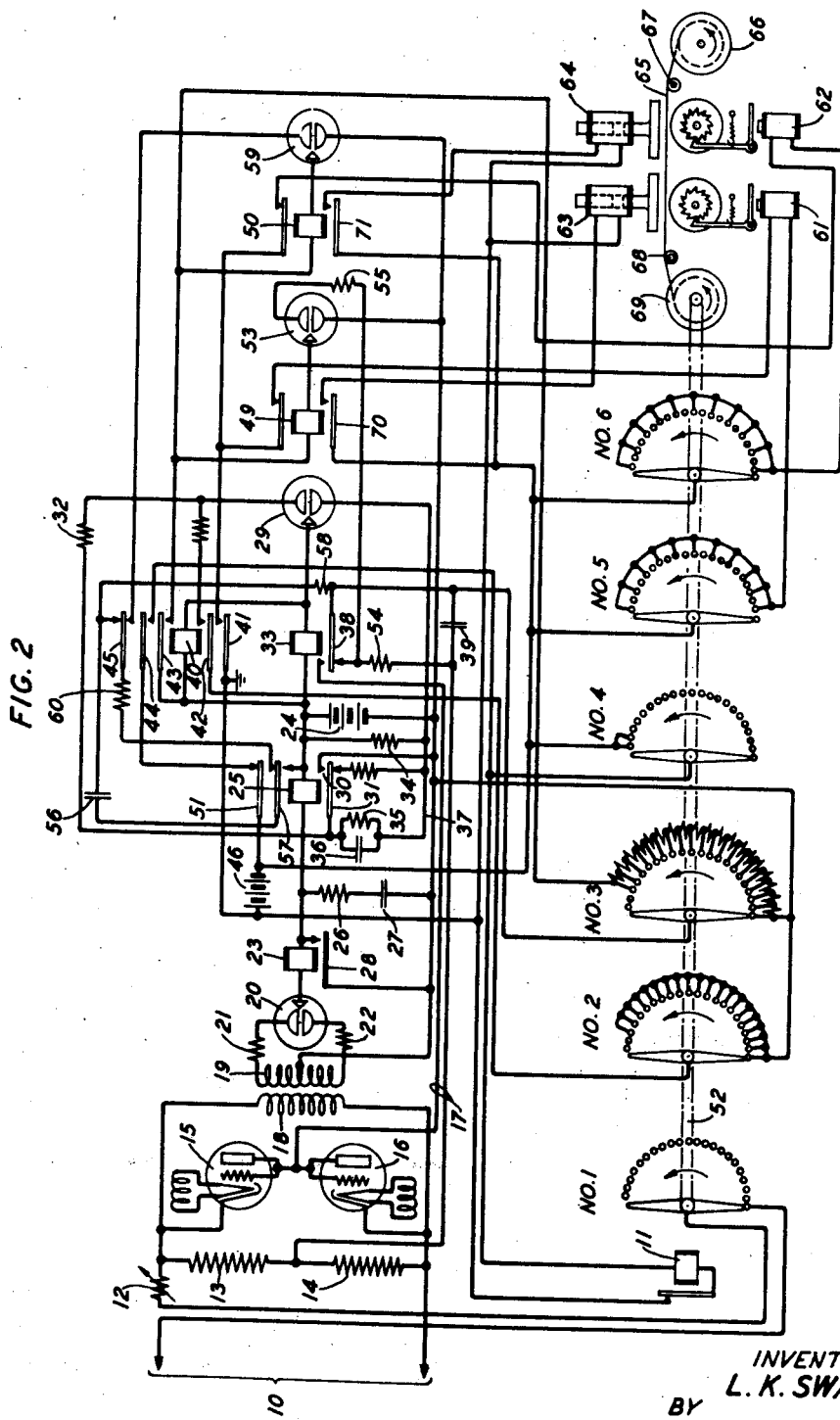

Patented Aug. 31, 1937

2,091,533

UNITED STATES PATENT OFFICE 2,091,533

AUTOMATIC MEASURING DEVICE

Leland K. Swart, Mountain Lakes, N. J., assignor to Bell Telephone Laboratories, Incorporated, New York, N. Y., a corporation of New York Application November 7, 1936, Serial No. 109,717

12 Claims. (Cl. 234—1.5)

This invention relates broadly to measuring devices and particularly to devices for measuring the amplitude and duration of a voltage surge.

The object of this invention is a measuring device which automatically indicates the amplitude or duration, or both, of a voltage surge.

A feature of this invention is a delay circuit which prevents the operation of the indicating device except upon the reception of a voltage surge which persists for more than a predetermined period of time.

Another feature is a means for removing the measuring device from the line while a voltage surge is being measured.

Still another feature is a circuit which permits the measurement of a transient surge after the surge has disappeared.

Still another feature is an automatic means for restoring the measuring device to normal after it has been actuated by a voltage surge.

The above object and features are attained by the use of a novel combination of apparatus and principles of operation which in its preferred form comprises a condenser which is adapted to be connected across a line in which it is desired to measure transient surges and also across a gas-filled discharge tube, and adding to the potential established in the condenser by the transient a known potential until the tube discharges. A full wave rectifier at the input enables surges of either polarity to be measured. A simple, yet accurate, delay circuit is interposed between the input of the measuring device and the condenser to prevent the charging of the condenser except upon the presence of a voltage surge which persists for a predetermined length of time, the purpose of this feature being to enable the measuring device to discriminate between surges induced by lightning and surges induced by other causes. Potential is added to the condenser by means of a potentiometer which constitutes one bank of a multiple bank machine switching selector. Another bank is used to remove the measuring device from the line upon the appearance of a voltage surge of the proper duration, a third bank restores the apparatus to normal, a fourth operates the amplitude measuring means, a fifth operates the duration measuring means, and a sixth holds certain relays in operative position while the measurement is being effected.

In one form the amplitude and duration of a voltage surge are measured by means of counting devices such as message registers, the operation of each register being interpretable as a predetermined voltage or length of time. In another form, the amplitude and duration are recorded as a double stamp, one stamp representing a known increment of voltage, and the other representing a known increment of time.

The preferred forms of the invention are shown in detail in the accompanying drawings, like reference characters referring to similar parts, which form a part of this specification and in which:

Fig. 1 is a schematic wiring diagram of the measuring device showing message registers as voltage and duration indicators; and Fig. 2 is a schematic wiring diagram of the measuring device showing stamps used in place of message registers.

Referring now to Fig. 1 for a detailed description of the circuit, 10 represents the input to the measuring device which is normally connected across a line in which transient surges are to be studied. The connection may be permanent since the operation of the measuring device is entirely automatic. One of the input leads is connected to the first contact of the No. 1 bank of contacts of selector switch 11 the cooperating arm of which is connected to a variable resistance 12. This resistance is used to make an initial adjustment for the measuring device. Across the input 10 are two high resistances 13 and 14 connected in series which comprise the input to two rectifier tubes 15 and 16 connected back to back so that pulses of either polarity at 10 will be transmitted through output circuit 17 as pulses of one polarity only.

Across input resistances 13 and 14, i. e. across the input to the measuring device, is connected the primary 18 of a step-up transformer which strengthens weak pulses sufficiently to enable them to operate certain portions of the device. Secondary 19 is connected across the cathode and control electrode of gas-filled tube 20 which is preferably of the cold cathode type so that it produces no drain on the power supply of the measuring device except when actually engaged in the measurement of a transient. Resistances 21 and 22 are current limiting resistances which limit the current from the control electrode to the cathode to a reasonably low value to prevent damage to these electrodes. The anode of tube 20 is connected to a vibrating relay 23 which periodically removes the anode potential and hence resets tube 20. Anode potential is supplied by "B" battery 24, through work relay 25, and sparking at resetting relay 20 is prevented by a resistance 26 and a condenser 27 connected in series and shunted across the battery side of relay 23 and its armature 28.

The discharge of gas-filled tube 20 causes current to flow from "B" battery 24 through work relay 25 which pulls up and places "B" battery potential across the anode and cathode of gas-filled tube 29. This is accomplished through front contact 30 and armature 31 of work relay 25, current-limiting resistance 32 to the cathode of tube 29, and through relay 33 to the anode of this tube. Pulling up armature 31, however, causes resistance 34, in series with resistance 35 and condenser 36 connected in parallel, to be shunted across "B" battery 24 so that condenser 36 is charged at a rate determined by resistances 34 and 35 and its own capacity. The resistance-condenser combination constitutes a delay circuit which is availed of through lead 37 to place an increasing potential upon the control electrode of gas-filled tube 29 which, when equal to the critical potential of the tube, causes it to discharge. The time of discharge will be slightly later than the time of energization of relay 25. This is done so that the measuring apparatus, which is controlled by tube 29, shall not operate except when a surge of a predetermined duration is presented at the input 10.

Assuming now that the required time has elapsed (for example, .08 second) and that the surge still persists, the control electrode of tube 29 will have reached its critical value and the tube consequently discharged and rendered conducting. The immediate effect of the discharge is to energize relays 33 and 40. Relay 33, on pulling up armature 38, will connect condenser 39 across the output leads 17 of rectifier tubes 15 and 16 so that condenser 39 may be charged to a potential corresponding to the potential of the surge, and relay 40 will set into operation the apparatus which is to measure the potential and duration of the surge.

Relay 40 is equipped with five armatures. Armature 41 connects "D" battery 46 through measuring relays 47 and 48 which are connected to No. 5 and No. 6 banks of machine switching selector 11; armature 42 maintains the proper discharge potential across the cathode and anode of tube 29 and hence locks in relays 33 and 40; armature 43 connects "B" battery 24 to relays 49 and 50 which control the circuits through measuring relays 47 and 48; armature 44 completes the circuit through machine switching selector 11 and "D" battery 46, thereby initiating the operation of the selector switch as soon as armature 51 of relay 25 is released; and armature 45 controls the measurement of the duration of the impulse.

While the voltage surge is present, relays 23, 25, 33 and 40 remain energized. As soon as the surge disappears, however, resetting relay 23 immediately restores tube 20 to its normal non-conducting condition and hence relays 23 and 25 become deenergized. Relays 33 and 40 are locked in through bank No. 2 and armature 42 which maintains the discharge potential between the anode and cathode of tube 29. Armature 51 of work relay 25 upon falling back, completes the circuit through "D" battery 46 and selector switch 11, and the latter immediately begins to rotate shaft 52. The six switch arms cooperating with six banks of contacts are mounted on shaft 52. No. 1 switch arm, upon moving to the second contact, breaks the circuit through one of the input leads 10 and thereby renders the measuring device insensible to succeeding voltage surges until the arm again reaches the first contact.

No. 2 switch arm is used to maintain uninterruptedly the discharge potential between the anode and cathode of tube 29 as long as a measurement is being made and hence the No. 2 contacts are connected together to provide a sliding contact, as many such contacts being connected as are employed in the measuring banks (to be described later). The contacts are connected to one side of battery 24 and the arm is connected through armature 42 to the cathode of tube 29.

No. 3 switch arm is connected to one terminal of condenser 39 which, it will be remembered, was charged to a potential corresponding to the potential of the surge. The opposite terminal of this condenser is connected to the control electrode of gas-filled tube 53 through resistances 54 and 55. The contacts of the No. 3 bank are so designed and connected as to comprise a potentiometer, one side of which is connected directly to the negative side of battery 24 and the other side of which is connected through armature 43 of relay 40 to the positive side of battery 24. As the No. 3 arm rotates, it adds a potential to the potential already on condenser 39 and at some point in its travel, the sum of the two potentials will be sufficient to discharge tube 53. Since it is important to maintain this tube in its discharged condition until the measurement is completed, the No. 3 arm is designed to provide a sliding connection between contacts so that the circuit through the contacts and arm is not broken except at the unconnected contacts.

The No. 4 arm restores the circuit to normal. The unconnected contacts in the No. 2 bank remove ionizing potential from tube 29 and hence reset it, thereby releasing relays 33 and 40. This, however, breaks the circuit through selector switch 11 and hence, unless other provisions were made would stop the selector at this point. The contacts of the No. 4 bank corresponding to the unconnected contacts of the No. 2 bank are therefore connected to battery 46 as a substitute for relay 40 to continue the operation of the machine switching selector until the opposite arm rests upon the first contact.

The No. 5 arm puts battery on one side of each measuring relay connected to the No. 5 bank of contacts. It will be remembered that the opposite side of each of these relays is connected, as long as tube 53 remains non-conducting, through the armature of relay 49 to ground. Thus as the machine switching selector steps around, each measuring relay will be operated until a point is reached at which the potential added to the potential on condenser 39 is sufficient to discharge tube 53. At this point ground will be removed from the measuring relays and hence, despite the fact that the arm continues to step around, no additional measuring relays will be operated. Each register, therefore, represents an increment of potential added to charging condenser 39, and by calibrating the potentiometer of the No. 3 bank, the peak voltage of the surge on the line can be determined from the number of measuring relays which were operated. Counting devices may be used with the measuring relays as, for example, in the ordinary message register.

The No. 6 bank, like the No. 5 bank, is connected to a series of measuring relays. The operation of these relays, however, is interrupted in terms of duration of applied voltage, instead of in terms of voltage itself. The timing apparatus comprises a condenser 56 which is charged through resistance 58 for the duration of the surge, the amount of charge being a measure of the duration of the surge. Upon the appearance of a voltage surge relays 23 and 25 pull up and remain pulled up only for the duration of the surge. Relays 33 and 40 pull up after a certain length of time, for example .08 second, as described above and remain pulled up until the measuring process is completed. Relay 25, through armature 57, connects one side of condenser 56 to the positive side of battery 24, the negative side of battery 24 being connected to the condenser through the first contact of No. 3 bank, its associated contact arm and charging resistance 58. Thus condenser 56 commences to charge at the beginning of the surge. At the instant the surge disappears, relay 25 falls off and armature 57 transfers condenser 56 to the control electrode of gas-filled tube 59, through resistance 60, armature 45 and the front contact of relay 40 provided the surge has been of proper duration and relay 40 has operated. The anode of tube 59 under this condition has already been connected through relay 50 and armature 43 of relay 40 to the positive side of battery 24. The No. 3 switch arm of selector 11 is connected to condenser 56 in the same manner as described above in connection with condenser 32. At the instant machine switching selector 11 begins to step around, positive potential is added to the control electrode of tube 59 until the tube discharges. The discharge of tube 59 energizes relay 50 and removes ground from measuring relays 48, so that from that time on no further energization of these relays is possible. Each measuring relay represents an increment of time, and from the constants of the charging circuit it is a simple matter to calibrate the relays in terms of time units.

After relays 33 and 40 are released, condenser 39 is discharged through armature 38 of relay 33 and resistance 54 and it remains in a discharged condition until another surge is to be measured. Likewise, condenser 56 is discharged upon the release of relay 40 through armature 45, resistance 60 and armature 57 and remains in this condition until relays 25 and 40 are again operated. The return of machine switching selector 11 to its starting position reapplies the measuring device to the line by completing a circuit through its No. 1 bank.

Thus it is seen that measurement of amplitude and duration in the apparatus of Fig. 1 is effected by means of measuring relays such as message registers, the total number of registers operated being an indication of the value of the quantity measured. In some cases, however, particularly where a permanent record is required, it may be desirable to record the quantities in a slightly different manner so that readily available permanent records may be obtained. Such a recording method is shown in Fig. 2 and utilizes, in lieu of message registers, a stamp which makes an impression after the measuring operation is completed. Quantities are indicated by counters which are operated by banks Nos. 5 and 6.

Referring particularly to Fig. 2, Nos. 5 and 6 banks of selector 11 are so connected that battery 46 is applied to counters 61 and 62 at stated intervals. These may be one or more contacts apart, depending upon the accuracy of measurement desired. The other side of counter 61 is connected to ground through relay 49, and the other side of counter 62 is connected to ground through relay 50. Counters 61 and 62 will therefore be actuated under the same circuit conditions as message registers 47 and 48 of Fig. 1, and hence counter 61 may be used to indicate the peak value of a voltage surge and counter 62 may be used to indicate the duration of the surge. To record these indications, stamps 63 and 64 cooperating with a strip of paper 65 may be used. Paper 65 is unwound from supply reel 66, passed over guide rollers 67 and 68 and wound on take-up reel 69. Shaft 52 of machine switching selector 11 is extended and connected to take-up reel 69 so that the paper is driven by the selector. Battery 46 is connected to stamp 63 through the front contact of an armature 70 added to relay 49, and in a similar manner battery 46 is connected to stamp 64 through the front contact of an armature 71 added to relay 50. Relay 49 is energized when the potential added to voltage measuring condenser 39 is sufficient to discharge tube 53, that is, at the end of the measurement, and hence stamp 63 will make a record on strip 65 of the reading of counter 61 at that instant. Relay 50 is energized when the potential added to duration measuring condenser 56 is sufficient to discharge tube 59, and hence stamp 64 will record the reading of counter 62 at that instant. Relays 49 and 50 are released when tubes 53 and 59 are reset. The connection between shaft 52 and take-up reel 69 is not rigid, but frictional so that pressure of either stamp on strip 65 will prevent it from being drawn past the counters. This is desirable in the design shown since relays 49 and 50 do not release immediately, but only after the circuit through banks No. 2 and No. 3 is broken.

From the foregoing description it is apparent that the measuring device is entirely automatic. It is simply connected across a line in which voltage surges are to be measured and left there as long as is desired. Incoming surges will first be discriminated against as to duration, and if sufficiently long, will immediately start the measuring device into action. Delay condenser 36 may, of course, be open-circuited if it is desired that all surges regardless of their duration are to be measured. While a surge is present it charges condenser 39, and as soon as the surge disappears, the charge on condenser 39 is measured by determining the amount of potential required to be added to it to discharge gas-filled tube 53, which had previously been biased to discharge at a predetermined voltage. Also while the surge is present, condenser 56 is charged through a resistance at a known rate, and when the surge disappears the potential of this condenser is used as a measure of the duration of the surge. The measurements are manifested either as operations of message registers, or as quantities recorded on a paper tape. In the case of message registers, the number of times a voltage of a particular value has appeared is determined by subtracting the reading of the register corresponding to the voltage value under inquiry from the reading of the adjacent register. The same method is used to determine the number of times a voltage of a particular duration has appeared. The registers can, of course, be cleared and the value of a voltage determined directly by an observer who is present at the time the voltage surge appears. In the case of the paper tape, the values desired are determined by subtracting the previous reading from the reading produced by the surge under investigation. The counters can likewise be cleared so that the values can be read directly. Both message registers and counters may be calibrated in voltage and time units directly to save translating abstract numbers into corresponding voltage and time values.

It is understood that the foregoing description is merely illustrative of the form the invention may take and the uses to which it can be put. It is understood further that the scope of the invention is not to be limited by the foregoing description, but is to be determined by the appended claims.

What is claimed is:

1. Apparatus for indicating voltage surges which comprises a condenser, means for charging said condenser to a potential corresponding to the voltage of the surge, a discharge tube cooperating with said condenser, means for adding sufficient potential to the charge on said condenser to cause the tube to discharge, and means for determining the value of the added potential whereby said added potential is a measure of the peak value of the voltage surge.

2. Apparatus for indicating the peak value of a voltage surge, said apparatus comprising a condenser adapted to be charged to a potential corresponding to the potential of the surge, a discharge tube cooperating with said condenser, a machine switching selector for adding sufficient potential to the charge on said condenser to cause the tube to discharge, means on said selector for rendering said condenser insensible to other surges while under the influence of one surge, and means operated by said selector for indicating the value of the voltage surge, said indicated value being a function of the added potential.

3. Apparatus for indicating the peak value of a voltage surge, said apparatus comprising means operated by the surge for rendering the apparatus inaccessible to succeeding surges while under the influence of said surge, means for indicating the peak value of the surge and means, operable after the value of the surge is indicated, for rendering the apparatus accessible to surges appearing after said surge is measured.

4. Apparatus for indicating the peak value of a voltage surge, said apparatus comprising means operated by the surge for rendering the apparatus inaccessible to surges occurring while said apparatus is under the influence of said surge, means for storing the surge, means operable after the surge has disappeared for determining the peak value of the stored surge, and means for rendering said apparatus accessible to succeeding surges after the peak value is determined.

5. Apparatus for measuring the peak value of a voltage surge comprising, a condenser for storing said surge, a gas-filled discharge tube adapted to be discharged by said surge, a resetting relay and a work relay cooperating with said tube, a second discharge tube, a delay means interposed between said work relay and said second discharge tube, relay means operable upon the discharge of said second discharge tube for applying said surge to said condenser, means operable upon the resetting of the first discharge tube and controlled by said condenser for measuring the peak value of the surge, and means, operable by the measuring means, for resetting said second tube.

6. Measuring apparatus as in claim 5 and means for rendering the condenser inaccessible to succeeding voltage surges while a measurement is being made.

7. Apparatus for measuring a potential applied to a line comprising a condenser for storing the potential, a gas-filled discharge tube in series with the condenser, a potentiometer adapted to increase the potential on said condenser by predetermined increments, and means, operable simultaneously with said potentiometer, for recording the number of increments required to raise the potential of said condenser to the potential required to discharge the tube, whereby the potential stored in said condenser may be measured.

8. Apparatus for determining the duration of a surge in a line, said apparatus comprising a condenser, a resistance, a source of potential, means for applying the source of potential to the condenser through said resistance, said means comprising a discharge tube adapted to be discharged for the duration of the surge, a second discharge tube, means operable upon the resetting of said first tube for applying the condenser to said second tube and simultaneously therewith applying a potential to the condenser in predetermined increments until said second tube discharges, and means for recording the number of increments added, whereby the duration of the surge may be determined.

9. Apparatus as in claim 8, said recording means comprising a counter mechanism, an electrically controlled stamp cooperating therewith, and means for energizing said stamp upon the discharge of said second tube.

10. Apparatus for determining the magnitude and duration of a voltage surge, said apparatus comprising a condenser, means for charging said condenser to a potential corresponding to the potential of said surge, a second condenser, a resistance, means for charging said condenser through said resistance for the duration of the surge, a discharge tube cooperating with the first condenser, a discharge tube cooperating with the second condenser, unitary means operable upon the disappearance of the surge for increasing the potential of each condenser by predetermined increments until its associated tube is discharged, and means for recording the number of increments required to be added to discharge each tube whereby the magnitude and duration of the surge may be determined.

11. Apparatus as in claim 10 and means for rendering said apparatus inaccessible to a surge while the magnitude and duration of a previous surge are being determined.

12. Apparatus as in claim 10, a machine switching selector having a plurality of banks of contacts and arms associated with said contacts, said unitary potential increasing means comprising one of said banks and arms, said increment recording means comprising two banks and arms, one for magnitude increments and the other for duration increments, and means on a fourth bank for disconnecting said apparatus from the line while the magnitude and duration of a surge are being measured.

LELAND K. SWART.